(12) United States Patent
Homer

(10) Patent No.: US 7,079,383 B2
(45) Date of Patent: Jul. 18, 2006

(54) COMPUTER WITH FORCE ABSORBING SUPPORT MECHANISM

(75) Inventor: Steven S. Homer, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 10/660,836

(22) Filed: Sep. 12, 2003

(65) Prior Publication Data

US 2005/0057896 A1    Mar. 17, 2005

(51) Int. Cl.
*G06F 1/16* (2006.01)
(52) U.S. Cl. .................... 361/686; 312/223.1
(58) Field of Classification Search ........ 361/679–686; 312/223.1, 223.2; 248/917–923; 710/303, 710/304
See application file for complete search history.

(56) References Cited

U.S. PATENT DOCUMENTS

| 5,375,076 A | * | 12/1994 | Goodrich et al. ............ 361/681 |
| 5,627,450 A | * | 5/1997 | Ryan et al. .................. 361/686 |
| 6,016,248 A | * | 1/2000 | Anzai et al. ................. 361/683 |
| 6,081,207 A |   | 6/2000 | Batio |
| 6,152,414 A | * | 11/2000 | Jondrow ................. 248/346.03 |
| 6,259,599 B1 |   | 7/2001 | Gamble et al. |
| 6,282,082 B1 | * | 8/2001 | Armitage et al. ........... 361/681 |
| 6,498,719 B1 | * | 12/2002 | Bridges ....................... 361/686 |
| 6,654,237 B1 | * | 11/2003 | Lee ............................ 361/683 |
| 6,724,614 B1 | * | 4/2004 | Chiang et al. .............. 361/681 |
| 6,807,050 B1 | * | 10/2004 | Whitehorn et al. ......... 361/681 |
| 6,882,524 B1 | * | 4/2005 | Ulla et al. ................... 361/680 |

* cited by examiner

Primary Examiner—Lisa Lea-Edmonds

(57) ABSTRACT

A portable computer comprises a base having a central processing unit and memory; a display electrically coupled to the base; and a support mechanism connected to the base and comprising a resilient bumper and a foot moveable between open and closed positions, wherein the foot supports the base in the open position.

18 Claims, 6 Drawing Sheets

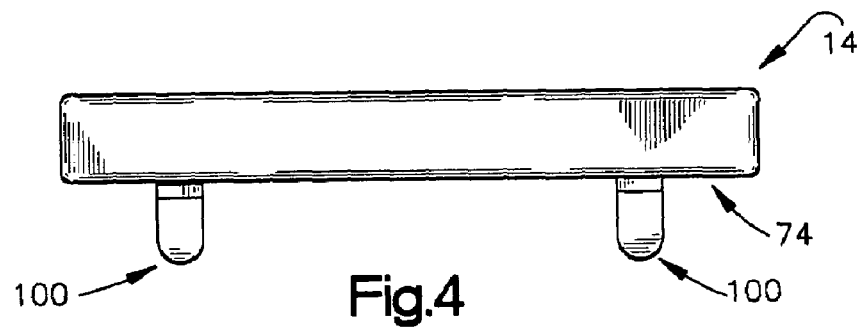
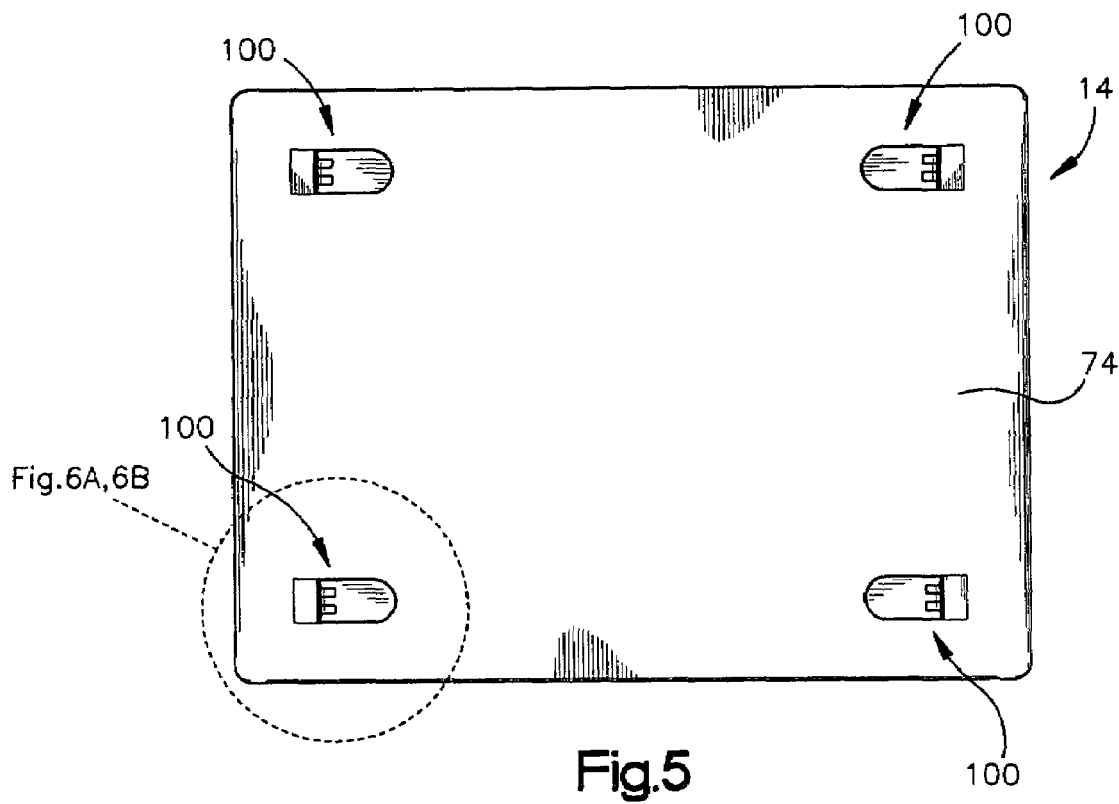

_COMPUTER WITH FORCE ABSORBING SUPPORT MECHANISM_

BACKGROUND

In some portable computing devices, the display includes a touch sensitive screen for inputting information. By touching specific areas of the screen, information can be entered into the computing device. Some PDAs, for example, do not have a keyboard and use a stylus for interacting with the screen and entering information. Other computing devices use both a keyboard and screen for entering data. A tablet personal computer (PC), for example, can function in a variety of ways. In one embodiment, the tablet PC can connect to a keyboard and be used like a traditional personal computer. In another embodiment, the tablet PC can be used with a stylus to enter data.

When tablet PCs, or other computing devices, are used without a keyboard, they are often horizontally positioned on a support surface. In this position, a user has a horizontal planar surface for writing or interacting with the screen. In some instances, a user may prefer to have the viewing or writing screen positioned at a slight angle. Angling the screen from the support surface can provide a more ergonomic posture for the user.

SUMMARY

In one embodiment, a portable computer comprises a base having a central processing unit and memory; a display electrically coupled to the base; and a support mechanism connected to the base and comprising a resilient bumper and a foot moveable between open and closed positions, wherein the foot supports the base in the open position.

In another embodiment, a method comprises elevating one side of a computer above a support surface with a support mechanism while an opposite side of the computer rests against the support surface; and absorbing force applied to the computer to prevent the support mechanism from breaking.

Other embodiments and variations of these embodiments are shown and taught in the accompanying drawings and detailed description.

BRIEF DESCRIPTION OF THE DRAWINGS

FIG. 4 is an end view taken along the lines 4—4 of FIG. 3.

FIG. 5 is a bottom view of a computer with support mechanisms.

DETAILED DESCRIPTION

Figure 1:
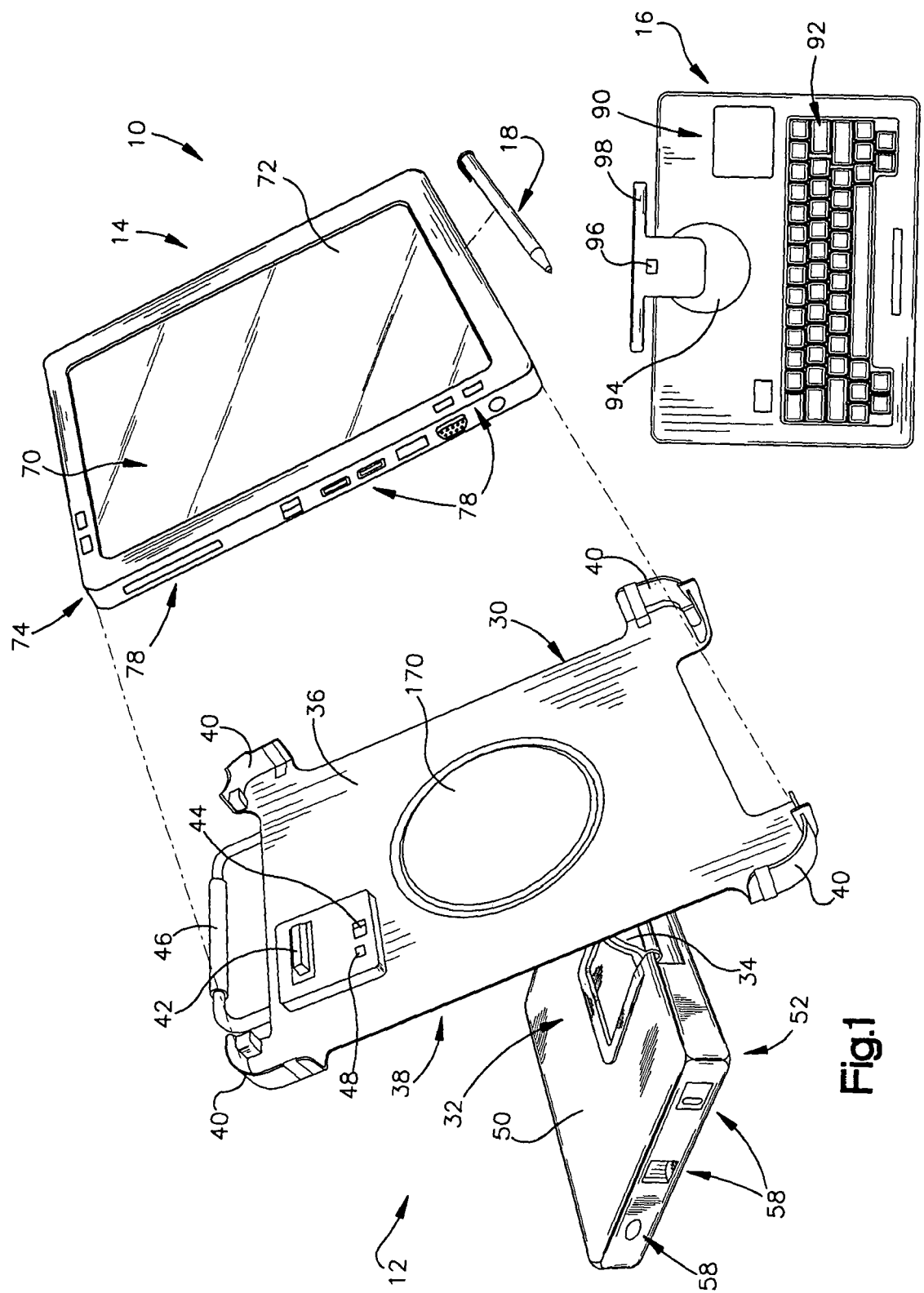
FIG. 1 is an exploded view of a computing system in accordance with an exemplary embodiment of the present invention.
Figure 2:
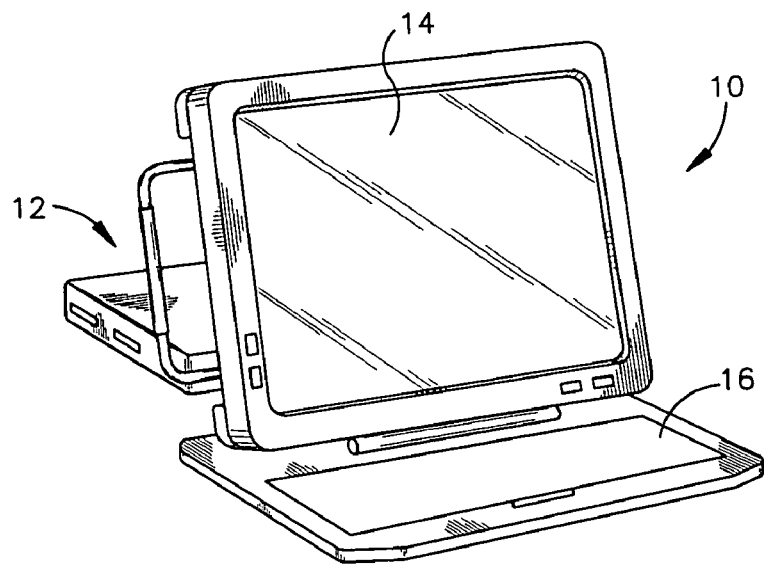
FIG. 2 is a perspective view of an assembled computing system.

FIGS. 1 and 2 show a computing system 10 in accordance with one exemplary embodiment. The computing system 10 generally comprises a docking station 12, a display or tablet 14, a keyboard 16, and a stylus 18. For convenience of illustration, a tablet personal computer (PC) system is illustrated in and discussed in connection with FIGS. 1 and 2. Embodiments in accordance with the present invention, though, are not limited to tablet PC systems or any particular type of computing system. By way of example, embodiments in accordance with the present invention include, but are not limited to, computers (portable and non-portable), labtops, notebooks, PDAs, tablet PCs, and other electronic devices and systems.

The docking station 12 generally comprises a stand or carrier 30, a base 32, and a viewing or mounting arm 34 connecting the carrier to the base. The carrier 30 is adapted to receive and hold the display 14 and provide electrical communication or coupling between the display 14 and the base 32. By way of example, the carrier 30 has a front surface 36 and a back surface 38 and may comprise a generally rectangular or square body having four brackets 40 extending outwardly from the front surface. Brackets 40 are positioned at respective corners of the carrier 30 and are adapted to align and hold the display in the carrier 30. The carrier also has a connector 42 and restraining latch 44 to connect with the display 14, a release handle 46, and an ejection pin 48 to disconnect the display from the carrier when the handle 44 is pulled.

The base 32 has a generally rectangular or square body with an upper or top surface 50 and a lower or bottom surface 52 that is positionable on a support surface. The base 32 may be configured in many different ways and may comprise and house many different components. By way of example only, the base can house and comprise a central processing unit (CPU), hard drive, memory, infrared ports, disk drives, PC card slots, batteries, USB ports, power connectors, monitor and display connectors, multibays, network connectors, CompactFlash card slots, power connectors, and other input/output (I/O) ports, just to name a few examples. Many of these features are generally shown at 58.

The display 14 generally comprises a front surface 70 with a view screen or panel 72 and a back surface 74. The screen 72 may be a touch sensitive screen that both displays data and inputs data when touched or activated. In other embodiments, the screen may only be capable of displaying information. In such embodiments, information can be input via keyboard 16, a mouse, voice activation, or other means. By way of example, screen 72 may be a backlit color liquid crystal display (LCD). Data may be entered through the screen using, for example, the stylus 18 or a user's finger. Images that appear on the screen provide a graphical user interface (GUI) and may be controlled with software (including handwriting recognition software) such that displayed images may be contacted or activated to input, edit, alter, or otherwise access information. When a user touches or activates a designated area on the screen, for example, the touch sensitive screen transmits a signal to the CPU. The display 14 may further include a retention mechanism for holding the stylus 18.

The display 14, in some embodiments, can be quite electronically sophisticated and may function as a computer, such as a stand-alone personal portable PC. By way of example only, the display 14 can house and comprise a central processing unit (CPU), hard drive, memory, infrared ports, disk drives, PC card slots, batteries, USB ports, power connectors, keyboard or monitor connectors, multibays, network connectors, CompactFlash card slots, power connectors, other input/output (I/O) ports, and numerous buttons and switches (such as Enter, Esc, Tab, Menu, Power, etc.), just to name a few examples. Many of these features are generally shown at 78.

The keyboard 16 generally comprises a top surface 90 with a plurality of keys 92 and may comprise or house a number of features. By way of example only, the keyboard 16 may house and comprise a rotation disk 94 (to rotate the display 14 while connected to the keyboard), connector 96 (to connect the keyboard to the display 14), and tilt adjustment 98 (to tilt the display 14 forward or backwards while connected to the keyboard), just to name a few examples. Further, as best shown in FIG. 2, the keyboard 16 may be both mechanically and/or electrically coupled to the display 14. For instance, the keyboard may only be electrically coupled to the display. In this latter configuration, the keyboard may be directly connected to the display (via an electrical connection, such as a cable or wire for example) or not physically connected (with data transmission occurring via wireless technology, via a remote location, or via other electronic devices, for example).

Figure 3:
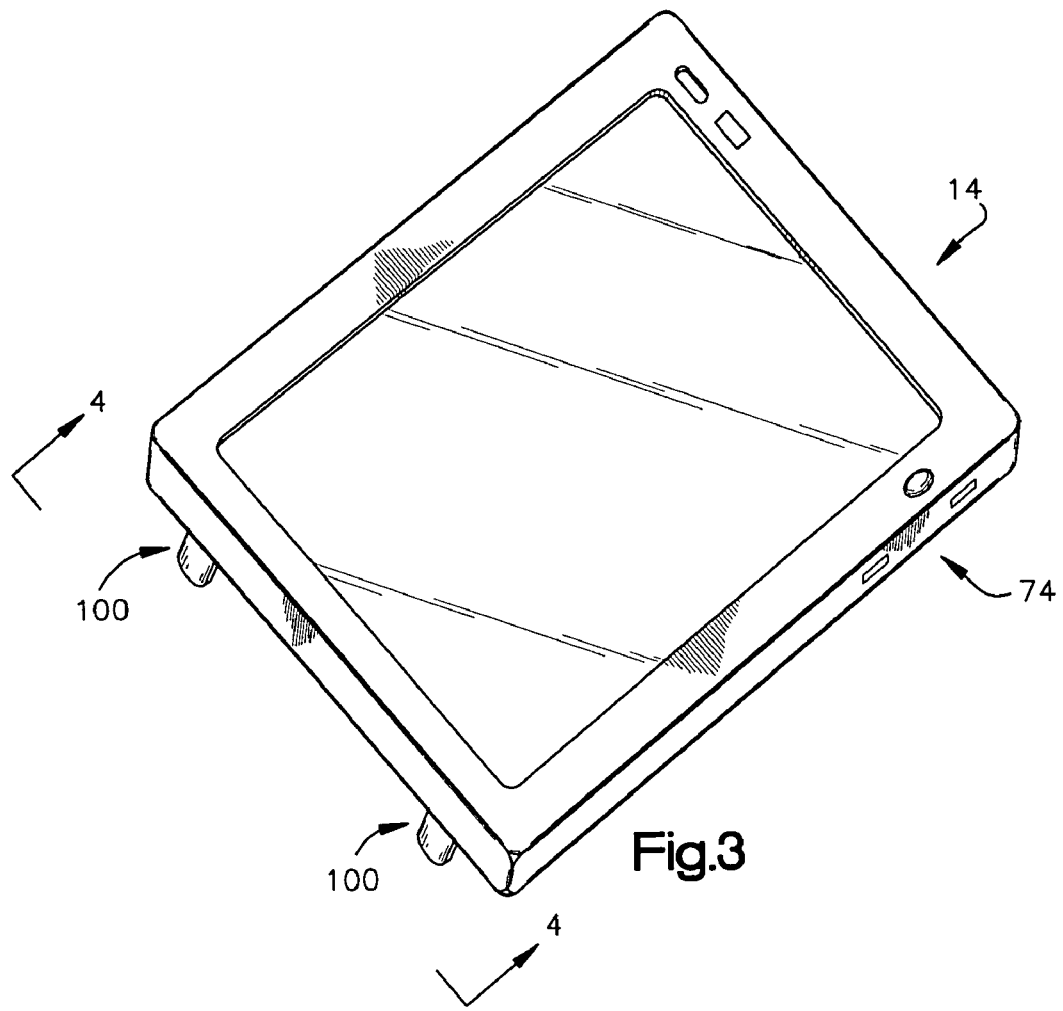
FIG. 3 is a perspective view of a computer with support mechanisms.

Turning now to FIGS. 3–5, the display 14 has a plurality of support members or mechanisms 100. The support mechanisms 100 are connected to the back surface 74. Each of the support mechanisms can be positioned at or adjacent a corner of the display 14 on the back surface 74. FIGS. 3 and 4, for example, show two support mechanisms 100 that extend downwardly from the display. FIG. 5 shows four support mechanisms 100.

The number of support mechanisms that are attached to the display may vary. In one embodiment, for example, a single support mechanism could be utilized. This single support mechanism could be centrally positioned along or adjacent an end or side surface of the display. Preferably, the support mechanism is configured with a size and shape to provide a sturdy support for the display when it is horizontally positioned on a support surface. In other embodiments (such as shown in FIGS. 3–5), multiple support mechanisms can be utilized.

The location of the support mechanisms also may vary. For example, although the support mechanisms are shown at or adjacent a corner of the display, they could be positioned elsewhere on the display. The support mechanisms could be centrally positioned along or adjacent an end or side surface of the display 14.

Figure 6A:
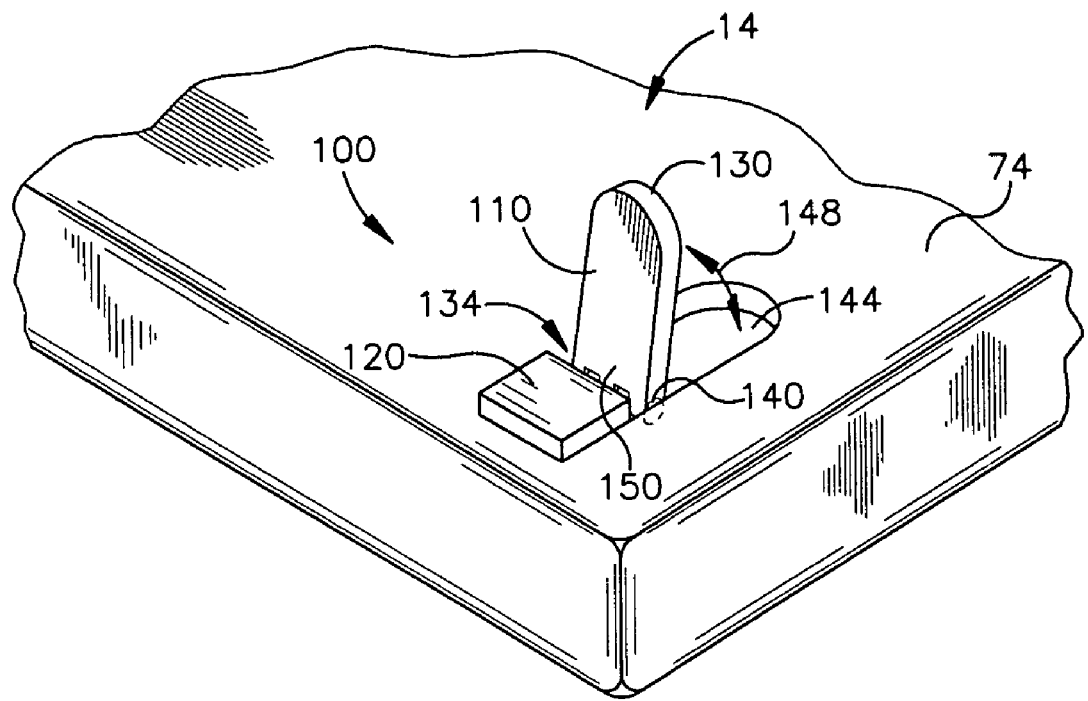
FIG. 6A is an enlarged view taken along dashed line 6 of FIG. 5 and shows a support mechanism in an open position.
Figure 6B:
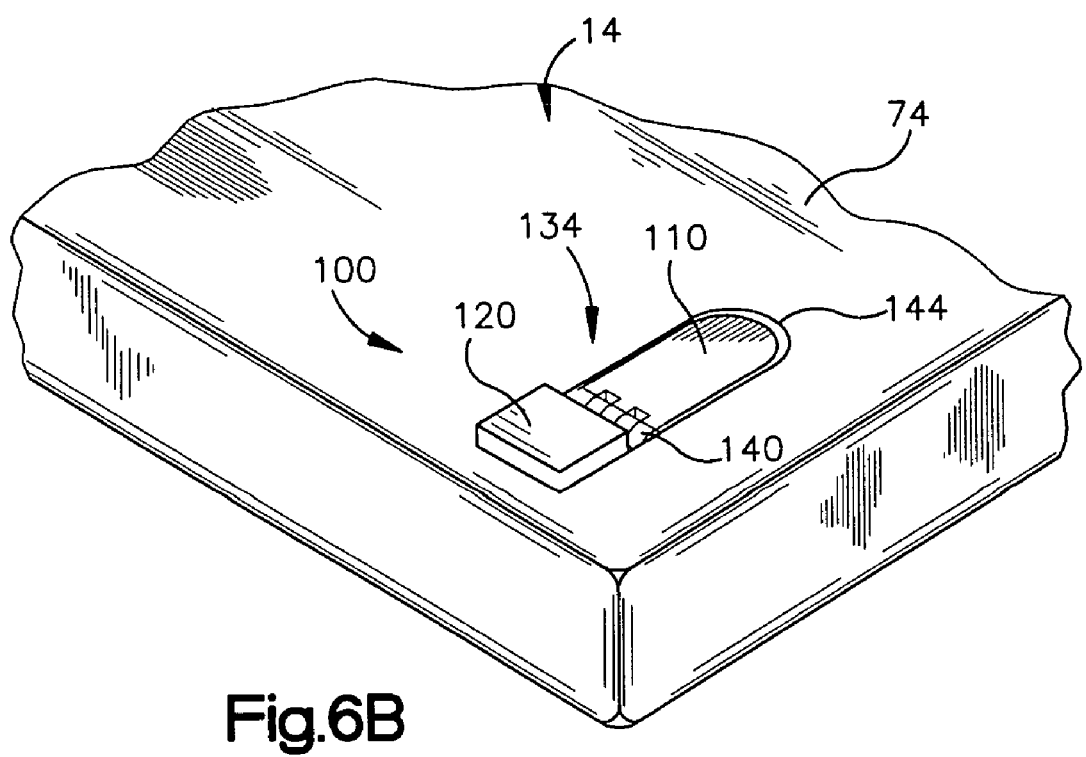
FIG. 6B is an enlarged view taken along dashed line 6 of FIG. 5 and shows a support mechanism in a closed position.

FIGS. 6A and 6B show a single support mechanism 100 in more detail. Each support mechanism 100 comprises a foot 110 and a bumper 120. The foot 110 has an elongated configuration and may have a variety of geometric shapes. By way of example and not in a limiting sense, these shapes include cylindrical, rectangular, square, triangular, conical, frusto-conical, and other polygonal or non-polygonal configurations. For convenience and as one example, foot 110 is shown as an elongated rectangle with a slightly rounded end 130.

The foot 110 is connected or mounted to the display and is adapted to rotate or pivot about one end 134. In this regard, end 134 connects to a hinge 140. Various hinge-type connections or other types of connections can be used to provide rotational movement to the foot 110. By way of example, the hinge connection can use a cylinder and sleeve connection. For example, end 134 could be rounded or cylindrical and rotationally disposed in a shaft or housing.

In one embodiment, the display 14 includes a recess, channel, or indentation 144 formed in the back surface 74. This recess 144 is adapted to receive the foot 110. As such, the recess 144 has a shape and size similar to the foot 110.

The foot 110 is moveable between an open and closed position. Movement of the foot is shown along arrows 148 in FIG. 6A. As best shown in FIG. 6B, when the foot 110 is disposed in the recess 144 (i.e., in the closed position), the foot is flush or parallel with the back surface 74. In other words, while in the closed position, the foot 110 does not protrude from the surface of the display. By contrast, when the foot 110 is disposed in the open position, shown in FIG. 6A, the foot extends outwardly and downwardly from the surface of the display. Preferably, the foot is formed from a strong, rigid, lightweight material, such as polymer or metal.

The bumper 120 is disposed adjacent foot 110 and, more specifically, is adjacent hinge 140 and end 134. The bumper 120 may be positioned into the recess 144 and adhered to the display with an adhesive or other means. Preferably, the bumper 120 is formed of a resilient or pliant material, such as polymer or rubber.

Figure 7:
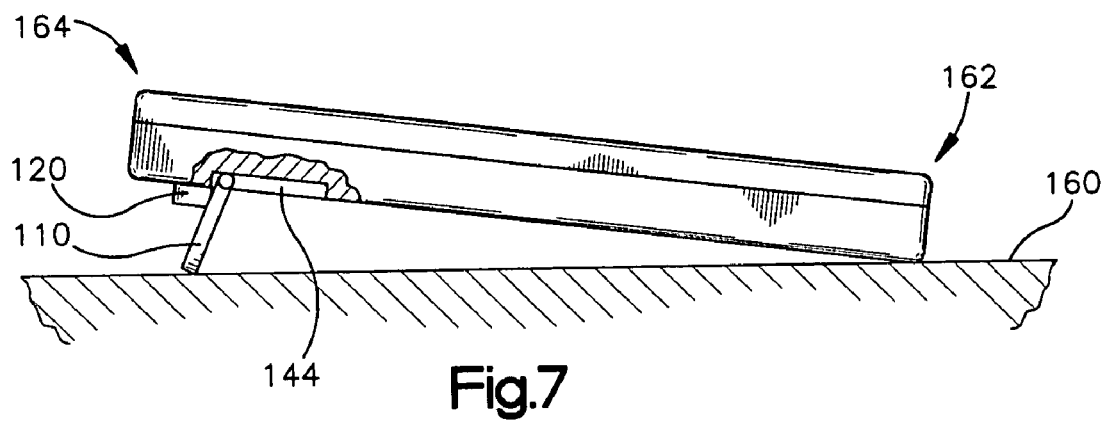
FIG. 7 is a side view of a computer with a support mechanism in an extended position against a support surface.

As best shown in FIGS. 6A and 7, the bumper 120 functions, in part, to limit the rotational movement of the foot 110. Foot 110 can rotate out of recess 144 until a back surface 150 contacts the bumper. At this point, shown in FIG. 7, the foot is stopped and prohibited from significant farther rotation.

The foot 110 is capable of rotating more than 90° to extend downwardly from the display. As shown in FIG. 7, the foot raises or elevates one end of the display 14 from a support surface 160. In this position, a first end 162 of the display rests against the support surface 160 while a second end 164 of the display is elevated from the support surface. This angle or inclination of the display provides an ergonomic writing surface or access to the display and screen.

As noted, the bumper 120 provides a stop mechanism for rotational movement of the foot 110. The bumper 120, though, can also provide a resilient or biasing member against the foot 110. For example, when the display 14 is in a horizontal position (shown in FIG. 7), a user can use the screen as a writing surface or data entry surface. If the user puts too much downward force or pressure onto the display, then the bumper will compress and absorb this force or pressure from the foot. Compression of the bumper can also provide the user with tactile feedback. In other words, a user could notice a slight downward movement of the display as the bumper compresses and note that this movement indicates too much pressure or force is being applied to the display. Preferably, the bumper is adapted to compress before the foot 110 breaks. Thus, compression of the bumper 120 and corresponding movement of the display can indicate to the user that additional force against the display could potentially break or damage the foot or feet.

Looking back to FIGS. 6A and 6B, the bumper 120 can be positioned to extend beyond or protrude above the back surface 74 of the display 14. Thus, when the foot 110 is positioned in the recess 144, the bumper 120 still protrudes from the surface of the display. The bumper then can provide a contact between the display and support surface. As such, the bumper 120 can also function to protect the display even when the foot is in the closed position. For example, if an unexpected or accidental force is applied to the display while it is resting on a support surface, this force could be transmitted to and absorbed by the bumper. The bumper thus can function as a shock or force absorber for the foot (if it is extended) and/or a shock or force absorber for the display (if the foot is retracted in the recess).

Figure 8:
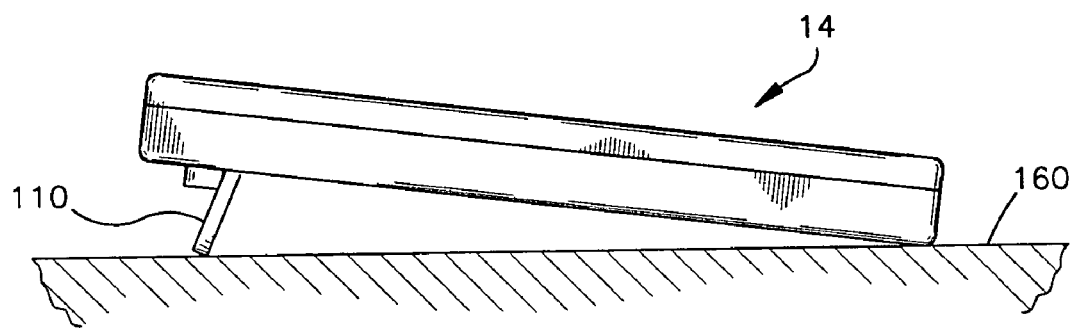
FIG. 8 is a side view of a computer in a horizontal portrait position.
Figure 9:
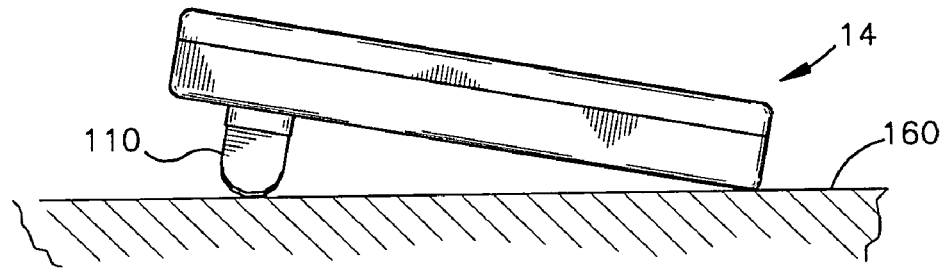
FIG. 9 is a side view of a computer in a horizontal landscape position.

FIGS. 8 and 9 show the display 14 in various positions. FIG. 8 shows the display in a generally horizontal portrait position with feet 110 extending downwardly to support the display on a support surface 160. FIG. 9 shows the display in a generally horizontal landscape position with feet 110 extending downwardly to support the display on a support surface 160.

Figure 10:
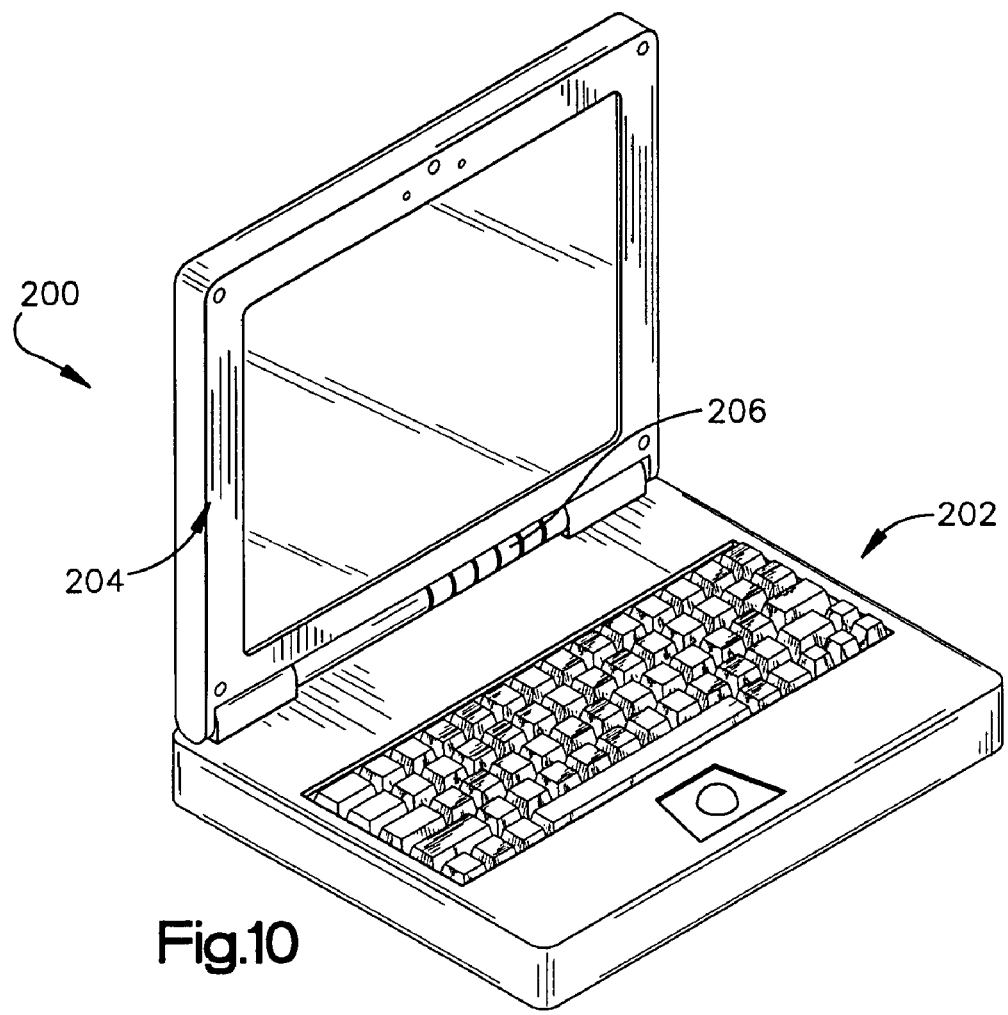
FIG. 10 is a perspective view of another embodiment of a computer.
Figure 11:
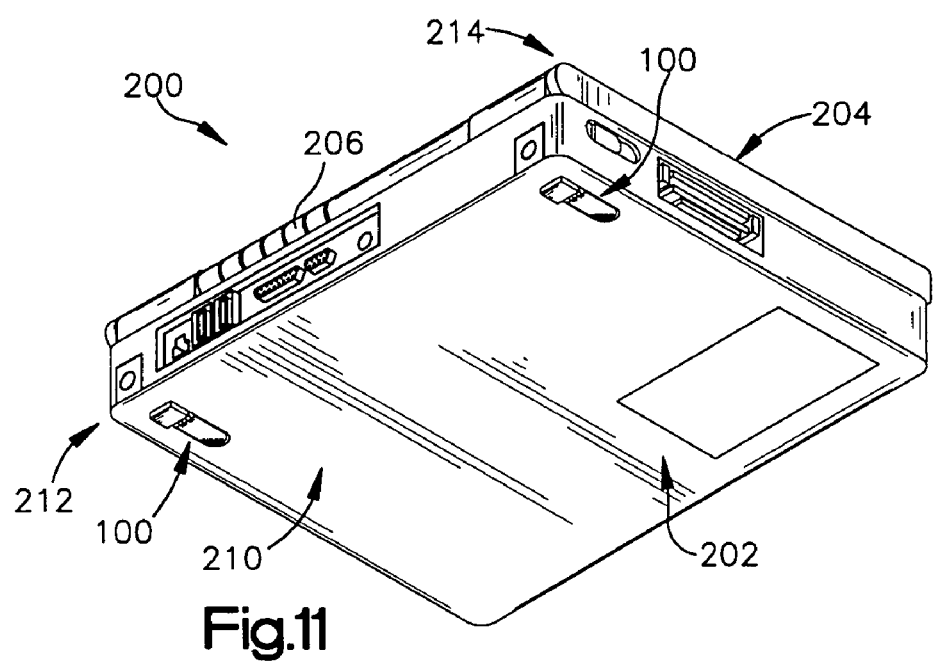
FIG. 11 is a bottom view of the computer of FIG. 10 with support mechanisms in a closed position.

FIGS. 10 and 11 show another computing device 200 in accordance with embodiments of the present invention. Computing device 200, for example, can be a personal computer and may comprise a base 202 and a display 204. The display 204 can be pivotally connected or attached to the base 202 with hinges 206. As such, the display 204 is moveable between an open position (shown in FIG. 10) and a closed position (shown in FIG. 11). The display 204 and base 202 function as a personal computer, as is known in the art.

A bottom surface 210 of the base 202 can include a plurality of support mechanisms 100. As an example, two support mechanisms can be provided, with one support mechanism at a first corner 212 of the base and a second support mechanism at a second corner 214 of the base.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A computing system, comprising:
   a docking station having a base and a carrier attached to the base; and
   an electronic display removably connectable to the carrier and comprising a front surface with a screen and a back surface with a support mechanism moveable between an open position and a closed position, wherein the support mechanism comprises a movable foot and a fixed resilient bumper to elevate one side of the display in the open position and absorb shock in the closed position, wherein the bumper abuts against the foot in the open position to absorb three transmitted from the foot to the bumper.

2. The computing system of claim 1 wherein the back surface comprises a recess adapted to receive the foot in the closed position.

3. The computing system of claim 2 wherein the foot is flush with the back surface in the closed position.

4. The computing system of claim 1 wherein the foot comprises one end pivotally connected to the display such that the foot is adapted to rotate and extend downwardly from the back surface and provide a support for the display in the open position.

5. The computing system of claim 1 wherein the bumper prevents rotation of the foot.

6. The computing system of claim 1 wherein the bumper is separated from and adjacent to the foot.

7. A portable computer, comprising:
   a base having a central processing unit and memory;
   a display electrically coupled to the base; and
   a support mechanism connected to the base and comprising a resilient bumper separated from and adjacent to a foot moveable between open and closed positions, wherein the foot supports the base in the open position, and wherein the bumper absorbs shock from the foot.

8. The portable computer of claim 7 wherein the bumper is affixed to a bottom surface of the base and compresses when the foot exerts force against the bumper.

9. The portable computer of claim 7 wherein the bumper provides a stop mechanism for rotation of the foot.

10. The portable computer of claim 7 wherein to support mechanism provides tactile feedback to a user to alert the user of potential breakage of the foot.

11. A method, comprising:
    elevating one side of a computer above a support surface with a support mechanism while an opposite side of the computer rests against the support surface;
    transmitting force applied to the computer from a movable foot to a fixed resilient bumper to prevent the support mechanism from breaking.

12. The method of claim 11 wherein the bumper is fixed to a bottom surface of the computer while the foot moves from open to closed positions.

13. The method of claim 11 wherein the support mechanism provides a user with tactile feedback to indicate potential damage to the support mechanism.

14. The method of claim 13 wherein providing a user with tactile feedback further comprises providing detectable movement of the support mechanism.

15. The method of claim 11 further comprising:
    pivotally moving the support mechanism from a closed position to an open position;
    resiliently stopping movement of the support mechanism before the support mechanism is damaged.

16. A computer, comprising:
    a display with a processor, memory, screen on a front surface, and support mechanism on a back surface, wherein the support mechanism comprises a means for elevating one side of the display from a support surface while an opposite side of the display remains against the support surface and a means for absorbing force transmitted to the means for elevating, wherein the means for absorbing is fixed to the back surface and separated from the means for elevating.

17. The computing system of claim 16 wherein the means for absorbing force prevents damage to the means for elevating when force is transmitted to the display.

18. The computing system of claim 16 wherein the means for elevating is rotationally moveable between a closed position being flush with the display and an open position being extended from the display.

* * * * *